United States Patent
Seaman et al.

(10) Patent No.: US 10,346,790 B1
(45) Date of Patent: Jul. 9, 2019

(54) CHAIN OF CUSTODY INFORMATION FOR CARGO TRANSPORTATION UNITS

(71) Applicant: BlackBerry Limited, Waterloo (CA)

(72) Inventors: Conrad Delbert Seaman, Ottawa (CA); Prabhul Dev, Nepean (CA); Ryan Michael Parker, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/913,189

(22) Filed: Mar. 6, 2018

(51) Int. Cl.
*G06Q 10/08* (2012.01)
*H04N 7/18* (2006.01)

(52) U.S. Cl.
CPC ..... *G06Q 10/0833* (2013.01); *G06Q 10/0838* (2013.01); *H04N 7/181* (2013.01); *H04N 7/188* (2013.01)

(58) Field of Classification Search
CPC ........... G06Q 10/0833; G06Q 10/0838; H04N 7/188; H04N 7/181
See application file for complete search history.

(56) References Cited

U.S. PATENT DOCUMENTS

| | | | |
|---|---|---|---|
| 7,475,814 | B2 | 1/2009 | Wingo et al. |
| 2004/0178880 | A1 | 9/2004 | Meyer |
| 2005/0027435 | A1 | 2/2005 | Scheppmann |
| 2007/0133980 | A1 | 6/2007 | Meyers |
| 2014/0357295 | A1 | 12/2014 | Skomra |
| 2016/0012696 | A1* | 1/2016 | Robinton ........... G06Q 10/0833 340/572.1 |
| 2016/0019497 | A1 | 1/2016 | Carvajal |

FOREIGN PATENT DOCUMENTS

WO    2015/171825 A1    11/2015

OTHER PUBLICATIONS http://www.tracks360.com/tracking-applications/gps-container-tracking-cargo-tracking-container-tracking-devices/—Container Tracking Solutions—RFID GPS Container Tracking System downloaded May 18, 2017 (3 pages).
Tracy Cozzens, Shipping container tracking on verge of big increase, Aug. 31, 2016—http://gpsworld.com/shipping-container-tracking-on-verge-of-big-increase/ (6 pages).
Zenatek—Container Tracking Devices, Monitoring and Reporting Systems—Army Technology—http://www.army-technology.com/contractors/logistics/zenatek/ downloaded May 26, 2017 (5 pages).
http://www.transportsecurity.com/gps-tracking.html—GPS Tracking—Transport Security, Inc.—ENFORCER Cargo Security Solutions downloaded Oct. 20, 2017 (3 pages).

(Continued)

*Primary Examiner* — Nam D Pham
(74) *Attorney, Agent, or Firm* — Trop, Pruner & Hu, P.C.

(57) ABSTRACT

In some examples, a system receives an image captured by a camera of a first cargo transportation unit (CTU) in response to an activation of the camera, the activation of the camera of the first CTU responsive to an event. The system determines based on the image an identifier of an entity that owns, operates, or has access to the first CTU or a second CTU, and logs the identifier of the entity in chain of custody information stored in a storage medium.

20 Claims, 3 Drawing Sheets

(56) References Cited

OTHER PUBLICATIONS

Giermanski, James, Smart Containers and the Chain of Custody, Feb. 11, 2007 (4 pages).
Huff, Aaron, Towing big data: trailer tracking suppliers look to deliver new insights, Mar. 7, 2017 (4 pages).
MarEx, The Maritime Executive, Tracking and Chain of Custody: The Difference, Nov. 17, 2011 (7 pages).
Seaman et al., U.S. Appl. No. 15/484,900 entitled Adjusting Cargo Transportation Unit Elements in Response to Theft Events filed Apr. 11, 2017 (27 pages).
Seaman et al., U.S. Appl. No. 15/684,089 entitled Determining Locations of Cargo Transportation Units Using Image Data filed Aug. 23, 2017 (26 pages).
European Patent Office, Extended European Search Report for Appl. No. 19160687.0 dated Apr. 5, 2019 (8 pages).

* cited by examiner

CHAIN OF CUSTODY INFORMATION FOR CARGO TRANSPORTATION UNITS

BACKGROUND

A transport chassis is a support structure that can be used to carry a cargo transportation unit (CTU), such as a shipping container. The shipping container can be used to carry cargo. The transport chassis can be part of a truck, or alternatively, can be part of a trailer that has wheels. In an arrangement where there are a large number of CTUs in a given area, it can be difficult to associate entities with the corresponding CTUs.

BRIEF DESCRIPTION OF THE DRAWINGS

Some implementations of the present disclosure are described with respect to the following figures.

Figure 1A:
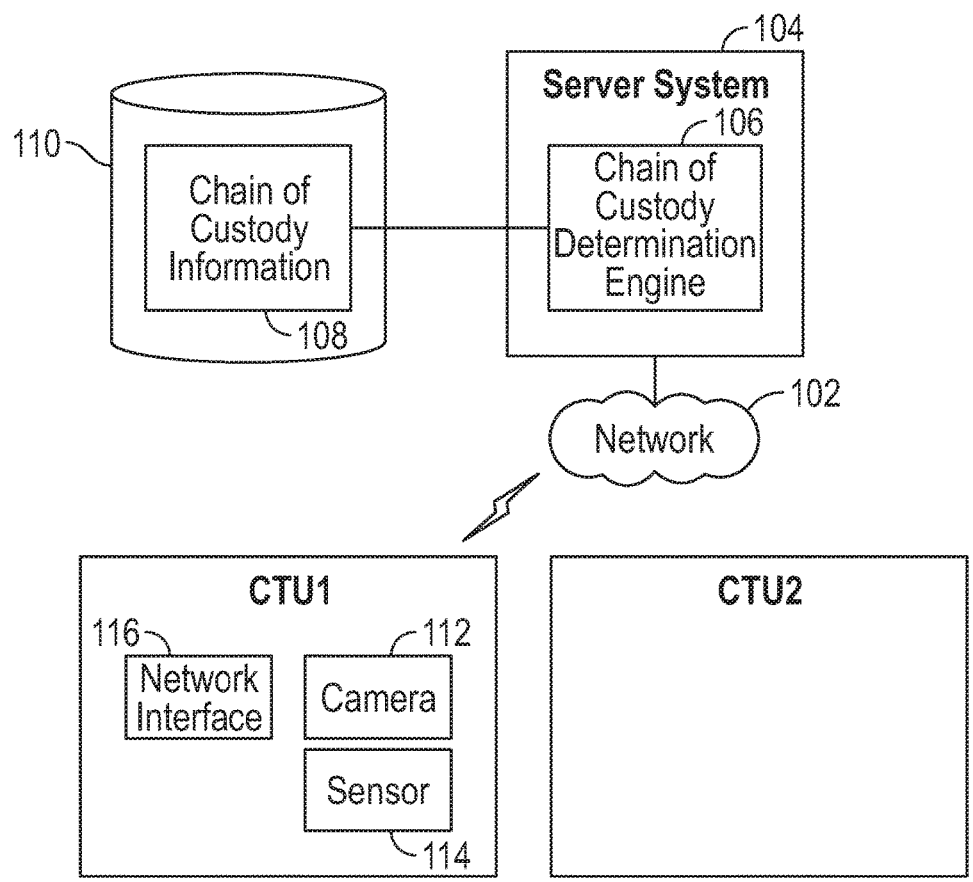
FIGS. 1A and 1B are block diagrams of example arrangements that include cargo transportation units (CTUs) and a server system, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A transport chassis can include any support structure that is designed to carry a cargo transportation unit (CTU), where a CTU is configured to carry cargo items. A "cargo item" can refer to any physical item that is to be delivered from one location to another location. "Cargo" can refer to one or more cargo items.

An example of a CTU is a shipping container that defines an inner chamber in which cargo can be placed. The shipping container can be enclosed on all sides, such that cargo items placed within the inner chamber of the shipping container are protected from the outside environment. In other examples, the shipping container can be partially open on at least one side, such as the top side, or a lateral side. In some examples, a shipping container can be referred to as an intermodal container. More generally, a CTU can refer to any platform or structure that is used to carry cargo.

In some cases, the transport chassis, although configured to carry a shipping container or other CTU, is able to also in some cases directly carry large cargo items, such as logs, large equipment, steel beams, and so forth.

A transport chassis can be part of a truck or a trailer (that is to be hauled by a tractor or other vehicle). More generally, a transport chassis is moveable by a vehicle between different geographic locations, for the purpose of carrying a CTU and/or cargo between different geographic locations. A transport chassis can be part of, mounted on, or attached, as applicable, to a vehicle, such as a truck, a trailer, a tractor, a car, a railed vehicle (e.g., a train), a watercraft (e.g., a ship), an aircraft, a spacecraft, and so forth.

In some examples, a vehicle to which a CTU is attached to, mounted on, or part of, can be a driverless vehicle that can be self-driving. A driverless vehicle (also referred to as an "autonomous vehicle") refers to a vehicle that is without a driver, i.e., a human that controls the movement of the vehicle while the driver is located on the vehicle. A self-driving or autonomous vehicle has the intelligence and self-awareness to perform driving tasks, including driving itself from an origin to a destination, without any human driver on the vehicle.

In other examples, CTUs can be hauled by vehicles driven by human drivers.

In some cases, there can be a large concentration of CTUs in a given area. For example, the given area can include a shipping yard, which is a location where CTUs are loaded with cargo and/or where cargo is unloaded from CTUs. In other examples, areas where there can be a large concentration of CTUs can include a border crossing location, a vehicle inspection location, and so forth.

It can be difficult to determine entities that are associated with CTUs, particularly if there is a large concentration of the CTUs in a given area. An entity that can be associated with a CTU can include an entity that owns, operates, or has access to the CTU. For example, the owner of a CTU can be an individual or an enterprise. An entity that operates the CTU can include a driver of the CTU, the owner of the CTU, and so forth. An entity that has access to the CTU can include any person (whether authorized or unauthorized) that is physically within the proximity of the CTU and thus is able to physically access the CTU or the content of the CTU.

In an unstructured environment with a free flowing of movement of CTUs and persons who are operating or have access to the CTUs, it can be difficult to determine a chain of custody of any given CTU. As used here, a "chain of custody" can refer to any information that is used to track entities that have owned, operated, and/or accessed the CTU. Should there be any issue with respect to a given CTU, the chain of custody for the given CTU can be used to determine who the owner, operator, and/or accessing entity is at or around the time that the issue occurred.

Also, the chain of custody can help with managing efficiency in a shipping yard, such as by allowing for a determination of worker performance, determining which entity currently has the CTU, and so forth. For example, by being able to identify the entity associated with a CTU at a given time, the entity can be notified of an event or the entity can be contacted for a request. Also, in cases where a CTU is simply left in a location with no clear identification of who the owner of the CTU is, the chain of custody can be used to identify the potential owner of the CTU. There are other examples of how the chain of custody for CTUs can be used.

In addition, the chain of custody information 108 can be used by the server system 104 to notify an owner or operator of a CTU that has been left sitting a particular location for greater than some threshold period of time, to ask the owner or operator to move the CTU. In the case of driverless vehicles, the server system 104 can direct a driverless vehicle to transport a CTU to a location of the owner or operator of the CTU (e.g., transport the CTU from a shipping yard or parking lot to the owner or operator's facilities), as identified in the chain of custody information 108.

FIG. 1A is a block diagram of an example arrangement that includes CTU1 and CTU2, which are able to communicate over a network 102 with a server system 104. The server system 104 can include a computer system or an arrangement of computer systems. In some examples, the server system 104 can be part of a web server system, a cloud server system, and so forth.

The server system 104 includes a chain of custody determination engine 106, which is able to determine a chain of custody for a given CTU (or a set of CTUs) based on images captured by a CTU (or multiple CTUs).

As used here, the term "engine" can refer to a hardware processing circuit, including any or some combination of a microprocessor, a core of a multi-core microprocessor, a microcontroller, a programmable integrated circuit device, a programmable gate array, or any other type of hardware processing circuit. In other examples, the term "engine" can refer to a combination of a hardware processing circuit and machine-readable instructions executable on the hardware processing circuit.

Chain of custody information (108) generated by the chain of custody determination engine 106 can be stored in a data repository 110. The data repository 110 can be part of the server system 104, or can be separate from and remote from the server system 104. The data repository 110 can be implemented using one or more storage devices.

In examples according to FIG. 1A, CTU1 includes a camera 112 and a sensor 114. Although CTU2 is depicted without a camera or a sensor, it is noted that in further examples, CTU2 can also include a camera and/or a sensor. Additionally, there can be other CTUs in further examples, where the other CTUs can also include cameras and/or sensors.

CTU1 includes a network interface 116 to communicate over the network 102 with the server system 104. In some examples, the network interface 102 includes a transceiver (to transmit and receive signals) and a protocol stack that controls communications over the network 102. The network interface 102 can communicate wirelessly over the network 102, which can include a wireless network, such as a cellular network, a wireless local area network (WLAN), and so forth.

An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by CTU1 to communicate with a remote service, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

The sensor 114 can include any or some combination of the following: a position sensor, a movement sensor, and so forth. A position sensor can be in the form of a Global Positioning System (GPS) sensor that uses satellite signals to determine a location of the sensor. In other examples, a position sensor can use wireless signals from access points or base stations of a wireless network to determine the location of the sensor based on triangulation of the wireless signals from the access points and base stations and based on known positions of the access points and base stations. A movement sensor can include an accelerometer, a gyroscope, or any other type of sensor that can be used to detect movement of a CTU or any portion of a CTU (such as a door of the CTU).

The camera 112 of CTU1 can be used to capture an image of an environment around CTU1. For example, the image of the environment around CTU1 can include an image of a human that is in the proximity of CTU1, or an image of another CTU (such as CTU2), or an image of a human in the proximity of CTU2.

In response to an event, such as an event indicated by an output of the sensor 114, the camera 112 can be triggered to capture an image of the environment around CTU1. The output of the sensor 114 can be used by the chain of custody determination engine 106 to determine a change in movement of CTU1. For example, if the sensor 114 is an accelerometer, the output of the accelerometer can be used to detect either CTU1 starting motion from a rest state, or stopping motion by coming to a rest state. In other examples, the sensor 114 can detect movement of a portion of CTU1, such as a door of CTU1. In such examples, the sensor 114 can include a gyroscope and/or an accelerometer, which can detect movement of the door. A door open event as indicated by an output of the sensor 114 can be used by the chain of custody determination engine 106 to trigger activation of the camera 112.

In further examples, the sensor 114 can detect vibration of CTU1, where the vibration can be used as an event to trigger the camera 112 to capture an image of CTU1's environment. Vibration may be caused by someone attempting to break into CTU1, for example. Triggering the camera 112 to capture an image of CTU1's environment in this scenario can help identify the person who attempted to or actually broke into CUT1.

The image captured by the camera 112 can be communicated over the network 102 to the server system 104 for processing by the chain of custody determination engine 106. Based on the image, the chain of custody determination engine 106 is able to determine an identifier of an entity that is associated with a CTU, such as CTU1 or CTU2, and to log the identifier of the entity in the chain of custody information 108 stored in the data repository 110. An "identifier" of an entity can refer to any information that can uniquely identify the entity, such as a person's name, a person's social security number, a person's employee number, a corporate name, a license number, a code associated with the person or enterprise, and so forth.

If the captured image of the environment around CTU1 includes image(s) of one or more humans around CTU1 and/or CTU2, a facial recognition process can be used by the chain of custody determination engine 106 to recognize each face in the captured image. The facial recognition process includes acquiring an image of a face of a human, and comparing the acquired image of the face of the human to a data repository of known facial images corresponding to different persons. If the acquired image of a face of a human matches a facial image in the data repository, then the corresponding identifier (e.g., a name, an employee number, etc.) can be retrieved for the corresponding person.

In this manner, the chain of custody determination engine 106 can determine either a person who has accessed CTU1, such as by opening a door of CTU1 to load or unload cargo in CTU1, or who has hitched CTU1 to a tractor, or perform another activity with respect to CTU1.

Additionally or alternatively, the captured image of the environment around CTU1 can include identification information of another CTU, such as CTU2. For example, the identification information of CTU2 can include a name or other identification information of an enterprise associated with CTU2, which can be printed on the outer wall of CTU2, or provided on a tag, plate, or other artifact attached to CTU2. Text processing can be used by the chain of custody determination engine 106 to detect the name or other identification information on CTU2. In another example, the captured image of the environment around CTU1 can include a license plate of a CTU, such as CTU2. The license plate includes a license number associated with CTU2, which constitutes a different type of identification information (that can be detected by the chain of custody determination engine 106 using text processing) relating to an entity associated with CTU2 (e.g., the owner of CTU2).

As a further example, the captured image of the environment of CTU1 includes an image of a person who is in the proximity of CTU2. In this case, facial recognition can be used to identify the person.

Figure 1B:
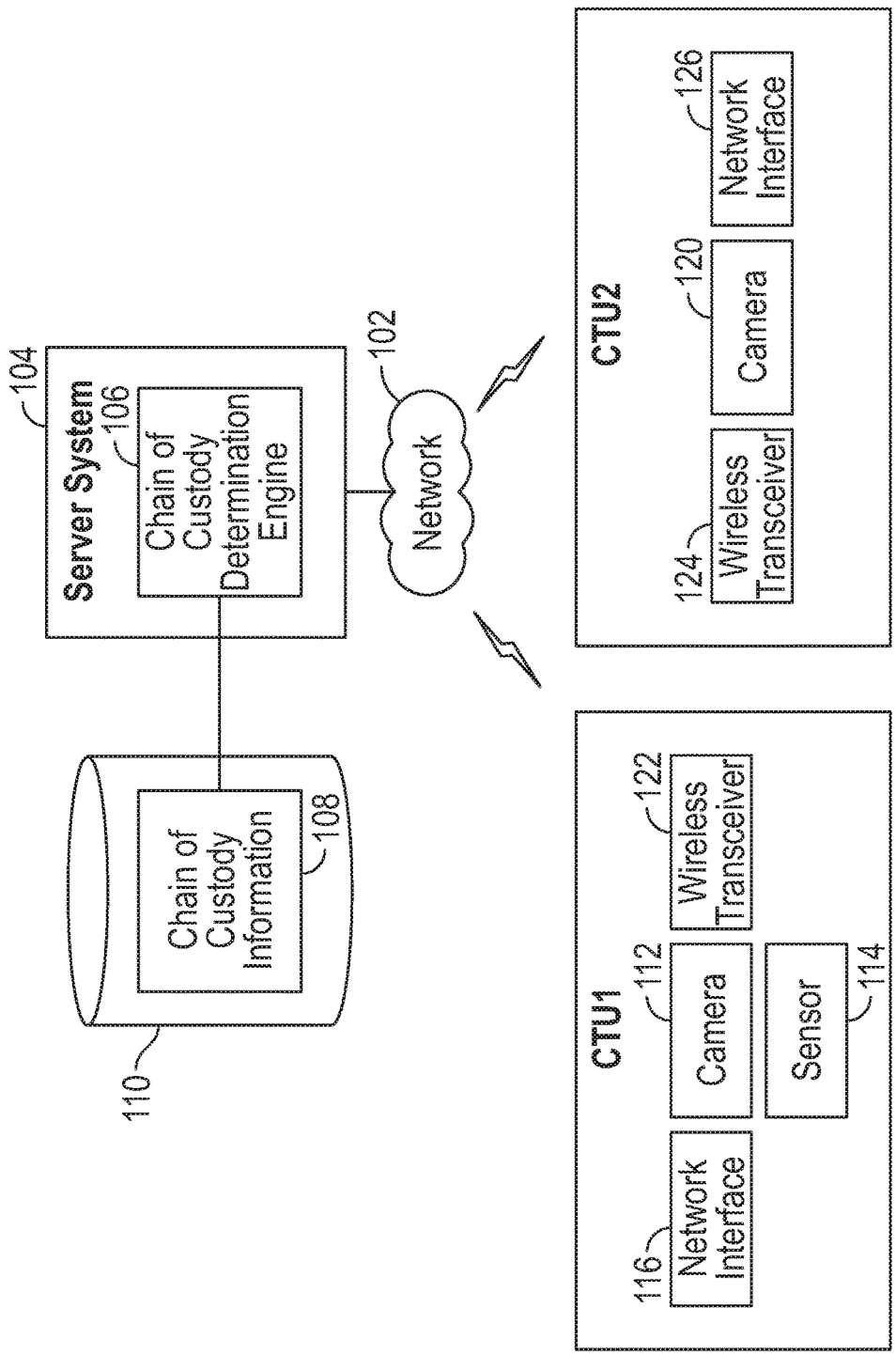

FIG. 1B shows another example arrangement that includes a server system 104, the data repository 110, the network 102, and CTU1 and CTU2. In FIG. 1B, CTU2 includes a camera 120 and a network interface 126 to communicate over the network 102. CTU1 includes the camera 112, the sensor 114, and the communication interface 116.

In the example of the FIG. 1B, the sensor 114 can provide an output that triggers the camera 120 of CTU2 to capture an image of CTU1 and/or an environment around CTU1. In some examples, the output of the sensor 114 can be transmitted to the server system 104, and the chain of custody determination engine 106 can use the output of the sensor 114 to trigger the camera 120 of CTU2 to capture the image of CTU1 or an environment around CTU1. For example, the chain of custody determination engine 106 can send a command over the network 102 to CTU2, to cause activation of the camera 120.

In other examples, instead of the chain of custody determination engine 106 triggering the camera 120 of CTU2 in response to the output of the sensor 114 of CTU1, CTU1 can directly trigger CTU2 to activate the camera 120. For example, CTU1 can include a wireless transceiver 122 that can communicate wirelessly with a wireless transceiver 124 of CTU2. The wireless transceivers 122 and 124 can communicate using Bluetooth signaling, Near Field Communication (NFC) signaling, Wi-Fi signaling, and so forth. The signaling from the wireless transceiver 122 can include a command or other indication to cause the camera 120 of CTU2 to activate to capture an image of CTU1 or an environment around CTU1.

In the example of FIG. 1B, both the camera 112 of CTU1 and the camera 120 of CTU2 can capture images of the environment around CTU1 and CTU2. The captured images are sent by CTU1 and CTU2 to the server system 104. The chain of custody determination engine 106 in the server system 104 processes the captured images to acquire an identifier of an entity associated with CTU1 and/or an identifier of an entity associated with CTU2.

Figure 2:
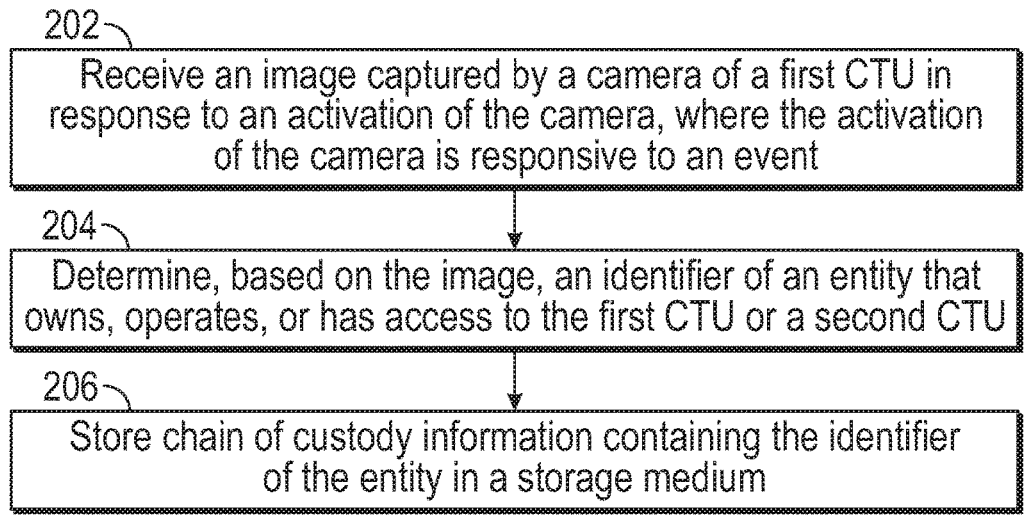
FIG. 2 is a flow diagram of a process according to some implementations.

FIG. 2 is a flow diagram of a process that can be performed by the chain of custody determination engine 106 according to some examples. The chain of custody determination engine 106 receives (at 202) an image captured by a camera of a first CTU (e.g., the camera 112 of CTU1) in response to an activation of the camera, where the activation of the camera is responsive to an event.

The chain of custody determination engine 106 further determines (at 204) based on the image, an identifier of an entity that owns, operates, or has access to the first CTU or a second CTU (e.g., CTU1 or CTU2).

The chain of custody determination engine 106 stores (at 206) chain of custody information containing the identifier of the entity in a storage medium, such as in the chain of custody information 108 in the data repository 110 of FIG. 1.

Figure 3:
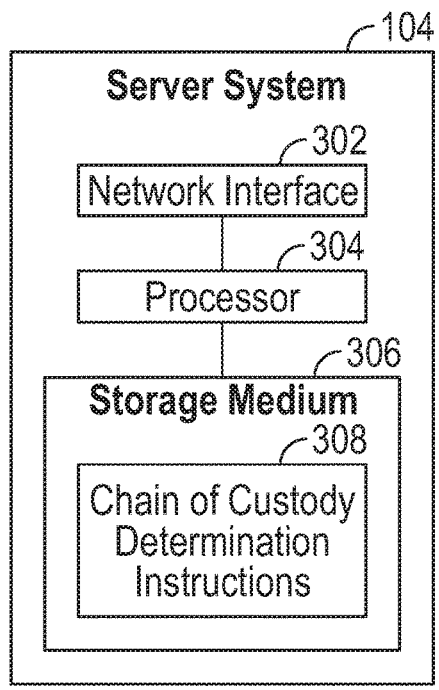
FIG. 3 is a block diagram of a server system according to two further examples.

FIG. 3 is a block diagram of the server system 104 according to some examples. The server system 104 includes a network interface 302 to communicate over the network 102. In addition, the server system 104 includes a processor 304 (or multiple processors). A processor can include any or a combination of a microprocessor, a core of a multi-core microprocessor, a microcontroller, a programmable integrated circuit, a programmable gate array, or another hardware processing circuit.

The server system 104 further includes a non-transitory machine-readable or computer-readable storage medium 306 storing machine-readable instructions executable on the processor 304 to perform various tasks. Machine-readable instructions executable on a processor can refer to the machine-readable instructions executable on a single processor or the machine-readable instructions executable on multiple processors.

The machine-readable instructions chain of custody determination instructions 308 to perform various tasks as discussed above, including those of the chain of custody determination engine 106.

The storage medium 304 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
at least one processor configured to:
receive an image captured by a camera of a first cargo transportation unit (CTU) in response to an activation of the camera, the activation of the camera of the first CTU responsive to an event;
determine based on the image an identifier of an entity that owns, operates, or has access to the first CTU or a second CTU; and
log the identifier of the entity in chain of custody information stored in a storage medium.

2. The system of claim 1, wherein the activation of the camera of the first CTU is responsive to the event occurring at the first CTU.

3. The system of claim 2, wherein the event comprises a detection of movement of a door of the first CTU.

4. The system of claim 2, wherein the event comprises a detection of a change in movement of the first CTU.

5. The system of claim 4, wherein the change in movement of the first CTU comprises the first CTU starting to move, the first CTU stopping, or the first CTU vibrating.

6. The system of claim 1, wherein the activation of the camera is responsive to the second CTU triggering the first CTU to activate the camera of the first CTU.

7. The system of claim 6, wherein the second CTU triggering the first CTU to activate the camera of the first CTU is based on use of wireless communication between the first CTU and the second CTU.

8. The system of claim 1, wherein the image captured by the camera comprises an image of a person accessing the first CTU or the second CTU.

9. The system of claim 1, wherein image captured by the camera comprises an image of information indicating a name of the entity that owns or operates the second CTU.

10. The system of claim 1, wherein the determining based on the image of the identifier of the entity is based on text processing in the image.

11. The system of claim 1, wherein the determining based on the image of the identifier of the entity is based on facial image processing in the image.

12. A method comprising:
receiving, by a system comprising a processor, an image captured by a camera of a first cargo transportation unit (CTU) in response to an activation of the camera, the activation of the camera of the first CTU responsive to an output of a sensor;
determining, by the system, based on the image an identifier of an entity that owns, operates, or has access to the first CTU or a second CTU; and
storing, by the system, chain of custody information containing the identifier of the entity in a storage medium.

13. The method of claim 12, wherein the sensor is part of the first CTU.

14. The method of claim 12, wherein the output of the sensor indicates movement of a door of the first CTU.

15. The method of claim 12, wherein the output of the sensor indicates a change in movement of the first CTU.

16. The method of claim 12, wherein the activation of the camera is responsive to the second CTU triggering the first CTU to activate the camera of the first CTU.

17. The method of claim 12, wherein the determining based on the image of the identifier of the entity is based on text processing in the image.

18. The method of claim 12, wherein the determining based on the image of the identifier of the entity is based on facial image processing in the image.

19. A non-transitory machine-readable storage medium storing instructions that upon execution cause a system to:
receive an image captured by a camera of a first cargo transportation unit (CTU) in response to an activation of the camera, the activation of the camera of the first CTU responsive to an event;
determine based on the image an identifier of an entity that owns, operates, or has access to the first CTU or a second CTU; and
log the identifier of the entity in chain of custody information stored in a storage medium.

20. The non-transitory machine-readable storage medium 19, wherein the event is indicated by an output of a sensor on the first CTU or another CTU.

* * * * *